Jan. 17, 1928.　　　　　　　　　　　　　　　　　　　1,656,648
O. C. RITZ WOLLER
AUTOMOBILE LAMP
Filed Aug. 2, 1926　　　　　　　2 Sheets-Sheet 1
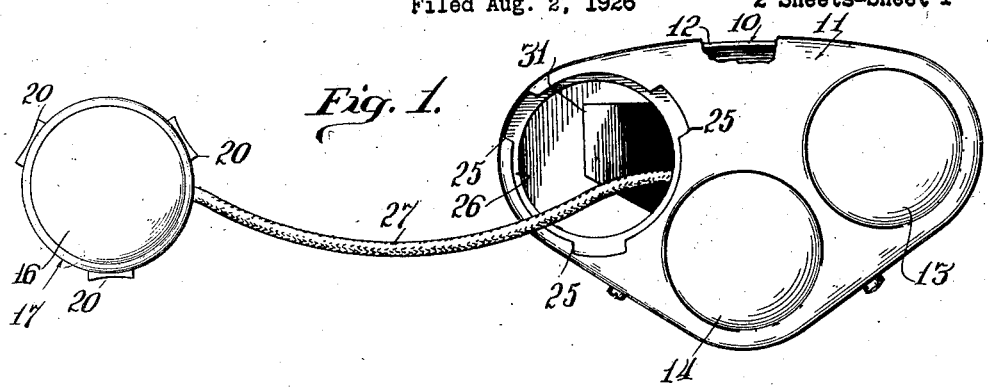
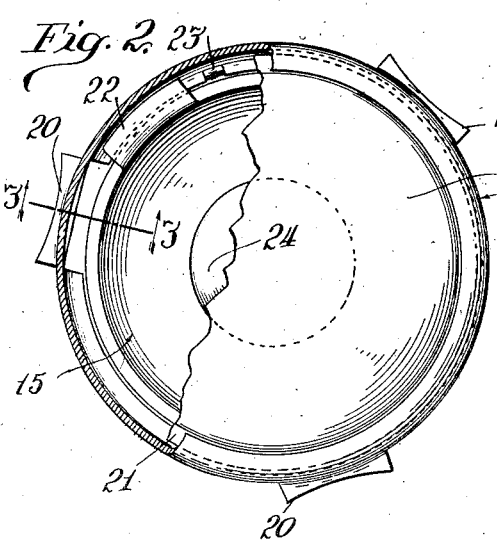
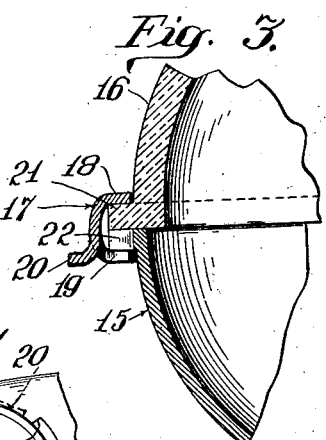
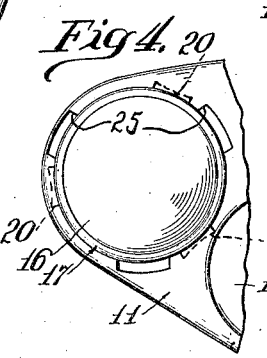
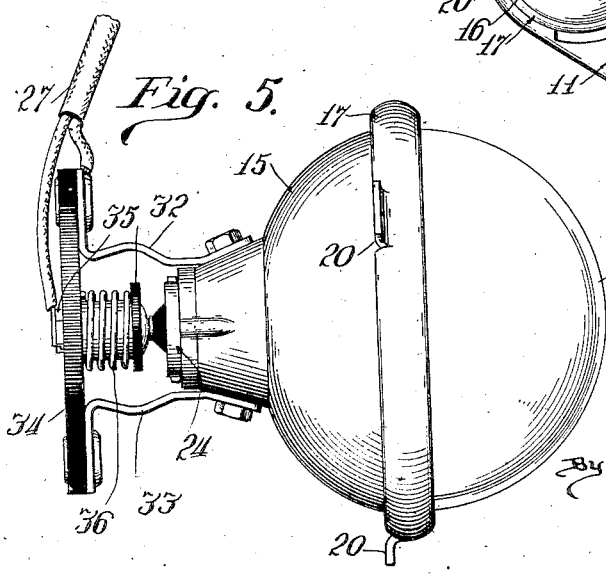
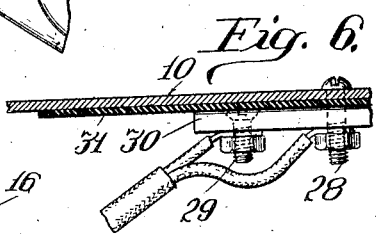
Inventor
Oliver C. Ritz Woller
By Fricke & DeBuck
Attorneys Jan. 17, 1928.
O. C. RITZ WOLLER
1,656,648
AUTOMOBILE LAMP
Filed Aug. 2, 1926    2 Sheets-Sheet 2
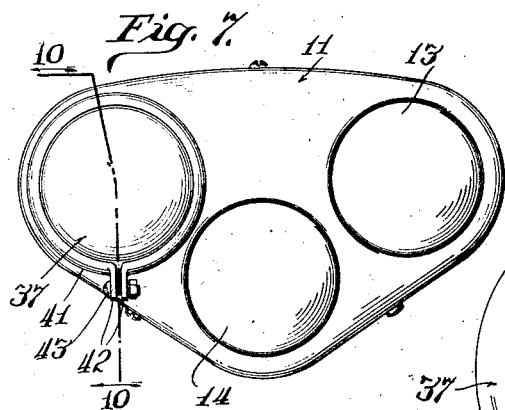
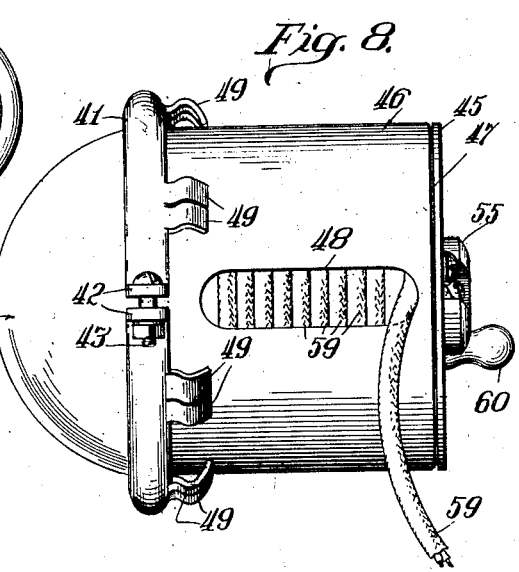
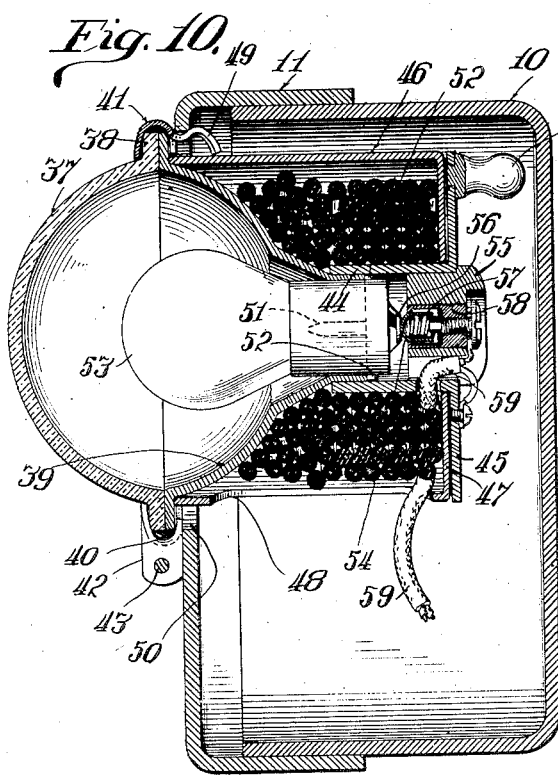
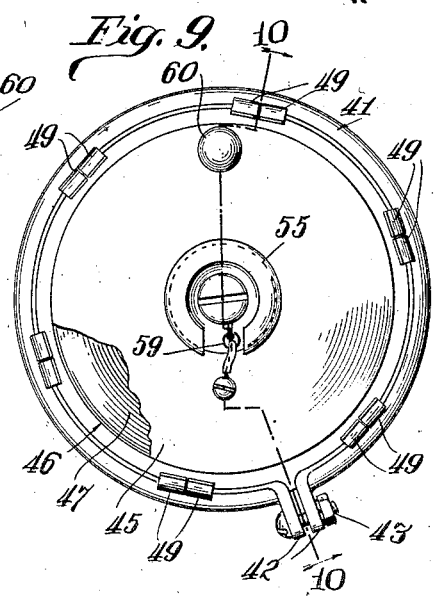
Inventor
Oliver C. Ritz Woller
By Fricke & DeBusk
Attorneys.

Patented Jan. 17, 1928.

1,656,648

UNITED STATES PATENT OFFICE.

OLIVER C. RITZ WOLLER, OF CHICAGO, ILLINOIS.

AUTOMOBILE LAMP.

Application filed August 2, 1926. Serial No. 126,477.

My invention relates to automobile lamps, and it has for its object to provide a new and improved construction and arrangement of parts by which the device may be used to advantage in fixed position as one of the usual lamps of an automobile equipment or may be used conveniently as a trouble lamp. To this end, it is one of the objects of my invention to improve the means for mounting a lighting unit and its connections. It is another object of my invention to provide an improved form of lighting unit comprising a reel upon which a flexible electric cable can be wound and so connected as to carry the lighting current to the bulb, the arrangement being such that when desired the reel and its associated bulb can be released from the fixed position and moved about as may be permitted by the unwinding of the cable from the reel.

It is another object of my invention to improve devices of this type in sundry details hereinafter pointed out. The preferred means by which I have accomplished my several objects are illustrated in the drawings and are hereinafter specifically described. What I consider as my invention and desire to cover by Letters Patent is set forth in the claims.

In the drawings—

Fig. 1 is a face view of one form of my improved lamp, with one of the lighting units removed from its normal fixed position for use as a trouble lamp.

Fig. 2 is a face view of the trouble lamp unit as shown in Fig. 1, but on an enlarged scale, and with certain parts broken away better to show the construction.

Fig. 3 is an enlarged detail view, being substantially a section taken at line 3—3 of Fig. 2.

Fig. 4 is a view of a fragmentary portion of the lamp shown in Fig. 1, but with the trouble lamp unit in its normal fixed position.

Fig. 5 is a view of the trouble lamp unit as seen from the left in Fig. 1.

Fig. 6 is an enlarged detail view, partially in section, showing the connection of the cable for the trouble lamp unit at the inner face of the back plate of the lamp casing.

Fig. 7 is a front face view of a modified form of lamp.

Fig. 8 is a bottom plan view of the trouble lamp unit of Fig. 7.

Fig. 9 is a rear face view of the trouble lamp unit of Fig. 8; and

Fig. 10 is a central vertical section taken on lines 10—10 of Figs. 7 and 9.

Referring to Figs. 1 to 6 of the drawings, in which corresponding parts are indicated by the same reference characters, 10 and 11 indicate the members of the casing of the form of lamp shown in Fig. 1, such members 10 and 11 being telescopically joined by means of flanges 12 preferably formed integrally with the members. In the construction shown in Fig. 1, the lamp casing is provided with a plurality of lighting units, as is indicated by the showing of the lenses 13 and 14 carried by the casing member 11, but it is believed to be unnecessary to describe these parts further in detail, inasmuch as my present invention relates to the other unit which is capable of use as a trouble lamp and which will now be described.

As is shown in Fig. 5, my improved trouble lamp unit is in the form of a housing comprising a combination reflector and socket member 15, and a lens 16 removably secured to the socket member 15 by means of a ring 17. As will be seen by an inspection of Figs. 2 and 3, the ring 17 comprises a top flange 18, and a bottom flange 19, the top flange 18 being continuous about the ring, while the lower flange 19 is discontinued at intervals by turning portions of the flange outwardly in the form of lugs 20.

As is best shown in Fig. 3, the lens 16 is held in position with respect to the ring 17 by an outwardly extending flange 21 carried by the lens and located between the flanges 18 and 19 of the ring. The socket member 15 is removably secured in the ring 17 by means of lugs 22 extending outwardly therefrom, such lugs 22 being preferably formed integrally with the socket member and being of a size such as to be insertable through the openings between the separated portions of the flange 19. A stop device 23 is provided in the flange 19 in position to limit the rotary movement of the socket member 15 in clockwise direction in Fig. 2, such stop device in the construction shown being in the form of a tongue pressed upwardly from the flange into the path of the lug 22 of the socket member. By the use of the releasable means for connecting the socket member 15 and the lens 16, access may be had to the interior of the socket member for placing a light bulb 24 in position within the lighting unit, as is shown in Figs. 2 and 5.

The lighting unit comprising the socket member 15, the bulb 24, and the lens 16, is adapted to be removably secured in position within the lamp casing by means of the outwardly extending lugs 20 which are insertable through notches 25 formed in the front plate of the casing member 11 in spaced relation about the opening in the plate for the lighting unit. When the lugs 20 have been inserted through the notches 25, the lighting unit is rotated in counter clockwise direction in Fig. 4 so as to bring the lugs 20 into position underneath the portions of the casing plate adjacent to the openings, being thus maintained releasably in position with the lugs 20 in contact with a gasket 26 suitably supported in spaced relation to the casing plate.

The means for connecting the bulb 24 with the lamp casing and with the source of electrical energy comprises a duplex cable 27 one wire of which is connected with the casing member 10 by means of a bolt 28, and the other wire of which is connected to a bolt 29 passing through a plate 30 of insulating material and separated from the casing member 10 by a second plate of insulating material 31. The bolt 29 and a suitable portion of the framework of the car are to be connected in the usual manner with the source of electrical energy.

At the opposite end of the cable 27, the wires are connected with the bulb 24 by means comprising in effect a reel upon which the cable is adapted to be wound when the lighting unit is in use in fixed position and from which the cable is free to be unwound when the unit is to be used as a trouble lamp device. This connecting means comprises two metal arms 32 and 33 connected with the socket member 15 and extending rearwardly therefrom on opposite sides of the bulb 24, as is clearly shown in Fig. 5, such arms being connected at their rear ends with a disk or plate 34 of insulating material which extends transversely of the lighting unit, serving with the arms and the socket member to provide in effect a reel about which the length of cable 27 is adapted to be wound when the unit is to be inserted in its normal position as shown in Fig. 4. One of the wires of the cable 27 is connected with the arm 32, while the other wire is connected with a contact member 35 which is held by a coiled spring 36 in yielding engagement with the end contact of the bulb 24.

By my construction, the lighting unit comprising the bulb 24 and its cooperating parts is adapted to serve as a back-up light when in position in the lamp casing as shown in Fig. 4. With the unit 16 acting as a back-up light, the units comprising the lenses 13 and 14 would preferably be employed as a rear light and a stop light. The several units would ordinarily be provided with separate switches for turning them on and off either manually or automatically as might be desired in accordance with ordinary practice. When it should be desired to employ a trouble lamp, the unit comprising the lens 16 would be rotated in clockwise direction in Fig. 4 for releasing it from the lamp casing, whereupon the unit could be moved to any desired position within the limits of the cable 27.

When it is desired to renew or exchange the bulb 24, access is readily had to the bulb by the rotation of the socket member 15 in counter-clockwise direction in Fig. 2 with respect to the ring 17, as above described. The lens 16 is preferably of clear glass, and the socket 15 is preferably in the form of a reflector so that the trouble light unit can be used to very good advantage for its special purpose. Inasmuch as the bulb 24 is fully protected by its individual housing comprising the socket member 15 and the lens 16 when the unit is being employed as a trouble lamp, there is very little danger of damage to the parts in use.

In the construction shown in Figs. 7, 8, 9 and 10, the construction is the same as that above described except that a modified form of trouble lamp unit is provided. In this construction a lens 37 provided with a laterally extending flange 38 is connected with a combination reflector and socket member 39 having an outwardly extending flange 40 which is secured to the flange 38 by means of a split ring 41. As is clearly shown in Fig. 9, the end portions of the ring are provided with outwardly extending ears 42 which are adjustably connected together by means of a bolt 43, the arrangement being such that when the bolt is tightened the ring is caused to grip the flanges 38 and 40 for holding the lens 37 rigidly in position upon the reflector member 39.

Upon the rear end of the reflector 39, I mount a sleeve 44 which has a tight friction fit about the end of the reflector member, the sleeve being provided at its rear end with an outwardly extending disk portion 45. Between the disk 45 and the flange 40 of the reflector member, I mount revolubly in position a reel casing member comprising a cylindrical portion 46 and an end plate portion 47, the cylindrical portion 46 being provided with a longitudinally extending slot 48 at one side thereof.

The means for holding the trouble lamp unit releasably in position within the lamp casing comprises a plurality of resilient fingers 49 formed integrally with the ring 41 at intervals thereabout, such fingers 49 being curved outwardly and then inwardly with respect to the ring so as to have yielding engagement with the opening 50 in the lamp casing member 11 for holding the trouble unit releasably in position, as will be readily understood from an inspection of Fig. 10.

As is also shown in said Fig. 10, the rear end portion of the socket member 39 is provided with longitudinally extending grooves 51 for permitting the passage of the outwardly extending pins 52 carried by the light bulb 53. The bulb 53 is held in position in its socket by means of a spring pressed contact member 54 mounted in a block 55 of fiber secured in the rear end of the sleeve 44, the contact member 54 being adapted normally to stand in engagement with the contact 56 of the bulb 53. The member 54 is normally held in extended position with respect to the block 55 by means of a coiled spring 57 interposed between the member 54 and a shoulder in a sleeve 58 rigidly secured in the block 55 in any suitable manner. An electric cable 59 has the end of one of the wires connected to the plate 45 forming a part of the framework, while the end of the other wire is connected with the sleeve 58. The cable 59 is shown in Fig. 10 as being wound about the reel formed by the sleeve 44, the plate 45, and the socket and reflector member 39, the other end of the cable being extended outwardly through the slot 48 above mentioned. The end of the cable 59 extending outwardly through the slot 48 is normally connected with the rear plate 10 of the lamp casing by some such means as that illustrated in Fig. 6 in connection with the cable 27.

With the trouble lamp unit as above described in position within the lamp casing, it functions as a back-up light as above described in connection with the construction shown in Figs. 1 to 6. When it is desired to use the unit as a trouble lamp, the unit is withdrawn from the lamp casing by a forward pull thereon serving to release the spring fingers 49 from the opening 50 of the casing. When the unit is withdrawn from the lamp casing, the unit is held by means of the reel casing 46, the whole trouble lamp unit being adapted to revolve with respect to the reel casing 46 for permitting the cable 59 to unwind from the reel to the necessary extent. If it is desirable to use the trouble lamp at only a short distance from the lamp casing, the reel casing 46 serves to hold the cable in position upon the reel without unwinding, while at the same time the cable is free to unwind as far as may be desired. When the unit is to be replaced within the lamp casing, the operator holds it by the casing 46 and rewinds the cable upon the reel by the use of a handle 60 mounted upon the plate 45 comprising a part of the reel structure. When the cable has been rewound, the unit may be very quickly and readily replaced in its operative stationary position within the lamp casing by a backward pressure upon the unit for causing the fingers 49 to have yielding engagement with the opening 50 in the lamp casing.

By the use of my construction, in which the trouble lamp unit is held releasably in position in the same lamp casing with the tail light and stop light units at the rear end of an automobile, the trouble lamp unit is always readily available for use for investigating the amount of gasoline in the tank, or for applying a spare tire to carrying position or removing it therefrom or for changing a rear tire when necessary. Under such circumstances the trouble lamp unit is made use of to advantage many times when it would not be used if it were not so conveniently located.

While I prefer to employ the construction as shown in my drawing, it will be understood that I do not wish to limit my invention to the form shown except as certain specific limitations are contained in the claims, since it is clear that changes might well be made in my construction without departing from the spirit of my invention.

I claim:

1. A lamp structure, comprising in combination a lamp casing, a reel casing releasably mounted in said lamp casing, a light bulb revolubly mounted in said reel casing, an electric cable connecting said light bulb with a source of current, and means for revolving said bulb for winding the cable thereabout.

2. A lamp structure, comprising in combination a reel casing having an opening in its side portion, a reflector member provided with means for supporting a light bulb in position therein, means for supporting said reflector member revolubly in position in said reel casing, a flexible cable connected with said reflector member and extending out through the opening in the reel casing, a handle at one side of the axis of rotation of the reflector member for rotating said reflector member for winding the cable thereon inside of the reel casing, a lamp casing, and means for releasably mounting the reflector member and associated parts in position in said lamp casing.

3. A lamp structure, comprising in combination a reel casing having an opening in its side portion, a reflector member provided with means for supporting a light bulb in position therein, a sleeve releasably mounted on said reflector member and having means engaging said reel casing serving normally to prevent removal of the reflector member from the reel casing, a flexible cable connected with said reflector member and extending out through said opening in the reel casing, a handle carried by said sleeve at one side of the axis of rotation of the reflector member for rotating said member for drawing the cable inwardly through said opening and winding it about the reflector and sleeve, a lamp casing, and means for releasably mounting the reflector member and associated parts in position in said lamp casing.

OLIVER C. RITZ WOLLER.